United States Patent
Nishimura (10) Patent No.: US 10,482,075 B2
(45) Date of Patent: Nov. 19, 2019

(54) INFORMATION PROCESSING DEVICE, INFORMATION PROCESSING METHOD, AND RECORDING MEDIUM

(71) Applicant: NEC CORPORATION, Tokyo (JP)

(72) Inventor: Shoji Nishimura, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 263 days.

(21) Appl. No.: 15/517,735

(22) PCT Filed: Oct. 9, 2015

(86) PCT No.: PCT/JP2015/005148
§ 371 (c)(1),
(2) Date: Apr. 7, 2017

(87) PCT Pub. No.: WO2016/059787
PCT Pub. Date: Apr. 21, 2016

(65) Prior Publication Data
US 2017/0329809 A1    Nov. 16, 2017

(30) Foreign Application Priority Data
Oct. 14, 2014 (JP) ................................ 2014-209936

(51) Int. Cl.
*G06F 7/00* (2006.01)
*G06F 16/22* (2019.01)
*G06F 16/28* (2019.01)

(52) U.S. Cl.
CPC ........ *G06F 16/2246* (2019.01); *G06F 16/285* (2019.01)

(58) Field of Classification Search
CPC .... G06F 16/353; G06F 16/345; G06F 16/287; G06F 16/168
See application file for complete search history.

(56) References Cited

U.S. PATENT DOCUMENTS 7,272,612 B2 *  9/2007  Birdwell ............. G06F 16/2264
7,752,233 B2 *  7/2010  Vempala ............. G06K 9/6224
                                                        707/802
(Continued)

FOREIGN PATENT DOCUMENTS

JP    2000-112988 A    4/2000
JP    2010-245983 A   10/2010

OTHER PUBLICATIONS

Jianquan Liu et al.; "Efficient Similarity Search using Tree Structure Index Based on Hierarchical Relation between Similarities"; The 5th Forum on Data Engineering and Information Management; May 31, 2013; pp. 1 to 8.

(Continued)

*Primary Examiner* — Daniel A Kuddus
(74) *Attorney, Agent, or Firm* — Sughrue Mion, PLLC (57) ABSTRACT

An information processing device according to the present invention includes: a search unit that searches data in a tree structure having a node; a grouping determination unit that determines whether to group using data and a lower node based on a similarity associated with an edge between data and the lower node of the data and a predetermined threshold; a subtree grouping unit that generates a group by grouping the data and the lower node; a leaf node grouping unit that generates one or a plurality of groups by grouping the leaf node when the node is a leaf node; a data merging unit that merges the data into any one of groups of lower nodes of the data when data returned in back track to an upper node are not belonged a group; and a group merging unit that merges some of the groups.

7 Claims, 9 Drawing Sheets

(56) References Cited

U.S. PATENT DOCUMENTS

| | | | |
|---|---|---|---|
| 8,156,430 B2* | 4/2012 | Newman | G06Q 10/107 |
| | | | 715/255 |
| 8,438,184 B1* | 5/2013 | Wang | H04L 67/02 |
| | | | 707/780 |
| 2007/0112802 A1* | 5/2007 | Volanen | G16C 20/90 |
| 2008/0228043 A1* | 9/2008 | Kenedy | G16H 50/30 |
| | | | 600/300 |
| 2008/0228677 A1* | 9/2008 | Kenedy | G16H 50/30 |
| | | | 706/13 |
| 2010/0106713 A1* | 4/2010 | Esuli | G06F 16/9027 |
| | | | 707/716 |
| 2010/0153923 A1* | 6/2010 | Kawahito | G06F 8/70 |
| | | | 717/124 |
| 2014/0126813 A1* | 5/2014 | Jia | G06K 9/4652 |
| | | | 382/165 |
| 2015/0058950 A1* | 2/2015 | Miu | H04L 63/105 |
| | | | 726/7 |
| 2015/0059003 A1* | 2/2015 | Bouse | G06F 16/2228 |
| | | | 726/28 |

OTHER PUBLICATIONS

International Search Report of PCT/JP2015/005148 dated Jan. 12, 2016.
Written Opinion for application No. PCT/JP2015/005148 dated Jan. 12, 2016.

* cited by examiner

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2015/005148, filed on Oct. 9, 2015, which claims priority from Japanese Patent Application No. 2014-209936, filed on Oct. 14, 2014, the contents of all of which are incorporated herein by reference in their entirety.

TECHNICAL FIELD

The present invention relates to an information search, and more particularly, to an information processing device, an information processing method, and a recording medium for grouping similar data.

BACKGROUND ART

Data such as an image and a document is often evaluated based on a similarity between features of the data more than evaluated based on agreement of the data. When classifying or summarizing such data, processing of grouping data so that a similarity between the data is equal to or greater than a predetermined value is effective. This processing is generally called grouping based on similarity (e.g., see PTL 1).

An information search device described in PTL 1 provides a function of grouping results of a similarity search input by a user (similarity search from a user) further into similar groups. In PTL 1, the information search device further executes a similarity search for similarity search results (similarity search for search results) received from a user when grouping the similarity search results received from the user. Then, for the search results, the information search device groups data which have similarities equal to or greater than a predetermined threshold into a group. The information search device executes grouping based on such an operation. At this time, the information search device executes a similarity search from a search result with a high similarity among the similarity search results from the user. Then, the information search device groups search so that the similarity is equal to or greater than the predetermined threshold. However, the information search device does not execute grouping on search results on which the similarity search has been already executed.

A data structure for speeding up a similarity search is proposed (e.g., see NPL 1). A technique described in NPL 1 constructs a data tree structure (hereinafter referred to as simply as a "tree structure") in consideration of a hierarchy of similarities between data. The technique described in NPL 1 achieves speed-up of a similarity search by using such a tree structure. The tree structure described in NPL 1 is roughly configured as following. That is, a node constituting the tree structure stores data. When a certain node includes data whose capacity exceeds a capacity of the node, the technique described in NPL 1 selects data (representative data) which becomes a representative among data included in the node, and disposes the representative data in a parent node of the node. Further, the technique described in NPL 1 associates an upper limit of a similarity between the representative data and the data in the node with an edge between the parent node and the node. Then, the technique described in NPL 1 maintains the tree structure in such a manner that a value of the similarity associated with the edge increases toward a leaf node from a root node in the entire tree structure. The technique described in NPL 1 provides a data structure focusing on the hierarchy of similarities as a tree structure. However, NPL 1 fails to disclose a grouping method.

CITATION LIST

Patent Literature

[PTL 1] Japanese Laid-open Patent Publication No. 2000-112988

Non Patent Literature

[NPL 1] Jianquan Liu, Shoji Nishimura, and Takuya Araki, "Efficient Similarity Search using Tree Structure Index Based on Hierarchical Relation between Similarities", The 5th Forum on Data Engineering and Information Management (The 11th Annual Conference of the Database Society of Japan), DEIM 2013, Session A9: Query Processing, Mar. 5, 2013

SUMMARY OF INVENTION

Technical Problem

PTL 1 discloses a technique relating to grouping for similarity search results from a user. In other words, the technique described in PTL 1 is not premised with general data. Accordingly, it is impossible to achieve grouping of general data. For example, it is impossible to execute a query such as "to an image database, grouping it what types of images in the database based on a similarity between them" by using the technique described in PTL 1. In this way, PTL 1 has an issue in that data to be target for grouping are limited.

Further, NPL 1 does not disclose a grouping method.

Therefore, the limitation of the data to be target for grouping cannot be solved even when PTL 1 is combined with NPL 1.

Further, for the technique described in PTL 1, it takes a lot of time to perform an operation for grouping similar data. This is because the technique described in PTL 1 executes a similarity search on each search result, the operation for grouping takes time in the order of $O(N^2)$. "$O(\ )$" represents a notation of providing a substantial evaluation of a variation in value, and is generally called "Landau symbol" or "O-symbol". Further, "N" represents a number of data. In this way, PTL 1 has an issue in that it takes a lot time to perform processing.

An object of the present invention is to solve the above-mentioned issues and to provide an information processing device, an information processing method, and a recording medium which are capable of reducing operation time and grouping based on a similarity of data, without limiting data to be a target of processing.

Solution to Problem

An information processing device according to one aspect of the present invention includes: a search unit that searches data in a tree structure which has a node including data as an element; a grouping determination unit that determines, based on a similarity associated with an edge between data included in a node of search target by the search unit and a lower node of the data and a predetermined threshold, whether or not to group using the data and the lower node;

a subtree grouping unit that generates a group by grouping the data and the lower node which are determined to be grouped as a result of the determination; a leaf node grouping means for generating unit that generates, when the node of search target is a leaf node, one or a plurality of groups by grouping the leaf node of search target; a data merging unit that merges, when data returned in back track to an upper node for search by the search unit are not determined to be belonged a group, the data into any one of groups of lower nodes of the data; and a group merging unit that merges at least some of the groups.

An information processing method according to one aspect of the present invention includes: searching data in a tree structure which has a node including data as an element; determining, based on a similarity associated with an edge between data included in a node of search target and a lower node of the data and a predetermined threshold, whether or not to group by using the data and the lower node; generating a group by grouping the data and the lower node which are determined to be grouped as a result of the determination; generating, when the node of search target is a leaf node, one or a plurality of groups by grouping the leaf node of search target; merging, when data returned in back track to an upper node for search are not determined to be belonged a group, the data into any one of groups of lower nodes of the data; and merging at least some of the groups.

A computer readable non-transitory recording medium according to one aspect of the present invention embodies a program. The program causes a computer to perform a method. The method includes: searching data in a tree structure which has a node including data as an element; determining, based on a similarity associated with an edge between data included in a node of search target and a lower node of the data and a predetermined threshold, whether or not to group by using the data and the lower node; generating a group by grouping the data and the lower node which are determined to be grouped as a result of the determination; generating, when the node of search target is a leaf node, one or a plurality of groups by grouping the leaf node of search target; merging, when data returned in back track to an upper node for search are not determined to be belonged a group, the data into any one of groups of lower nodes of the data; and merging at least some of the groups.

Advantageous Effects of Invention

According to the present invention, it is possible to provide advantageous effects that operation time can be reduced and grouping of data can be executed based on a similarity without limiting data to be a target.

DESCRIPTION OF EMBODIMENTS

Next, example embodiments of the present invention will be described with reference to the drawings.

Each of drawings illustrates example embodiments of the present invention. However, the present invention is not limited to the illustration in each of the drawings. In the drawings, similar components are denoted by the same reference numerals, and repeated explanations may be omitted. In the drawings used in the following description, descriptions of configurations that are not relevant to the explanation of the present invention are omitted, and the illustration thereof may be omitted.

<First Example Embodiment>

First, a configuration of an information processing device 10 according to a first example embodiment will be described.

[Description of Configuration]

Figure 1:
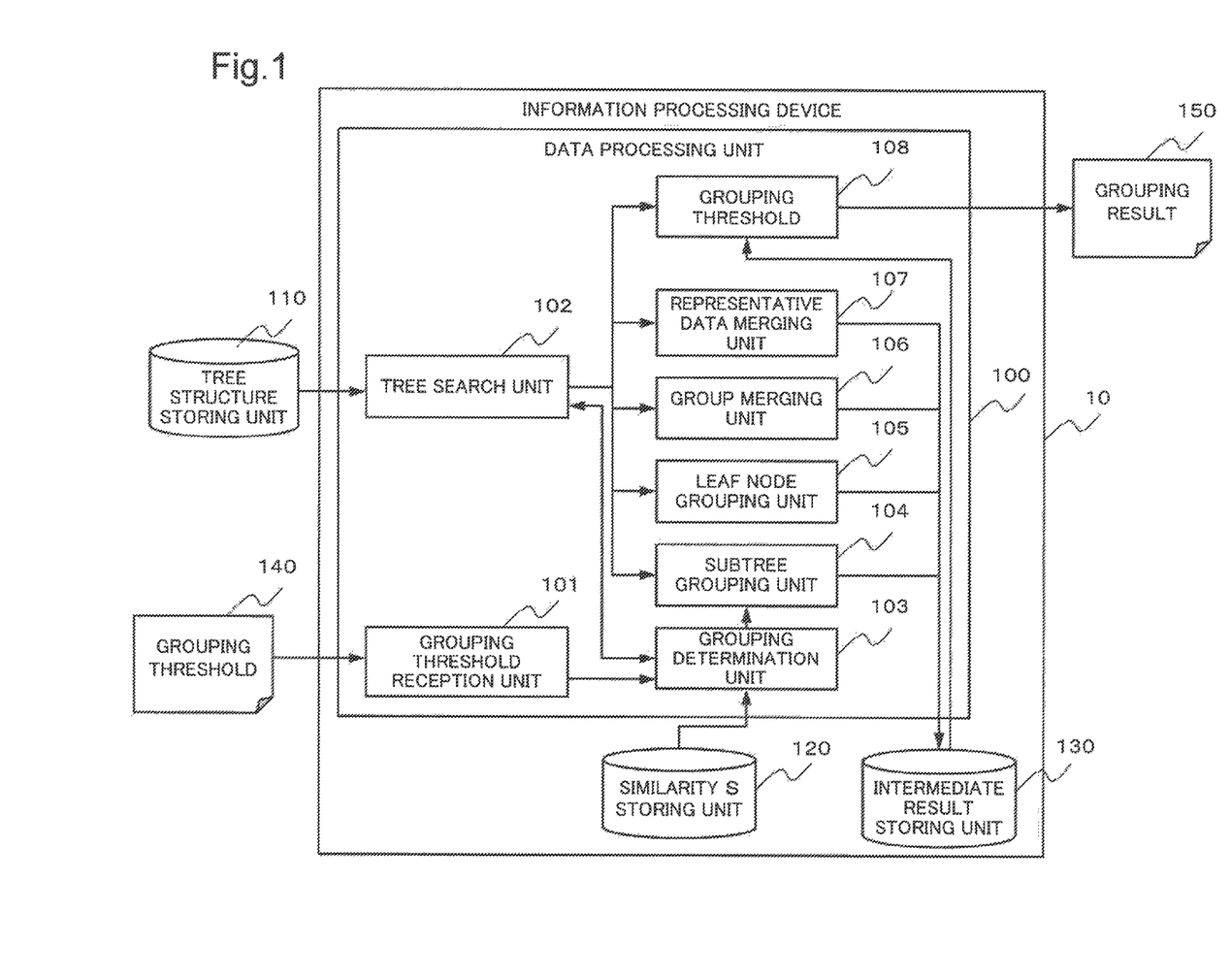
FIG. 1 is a block diagram illustrating an example of a configuration of an information processing device according to a first example embodiment of the present invention.

FIG. 1 is a block diagram illustrating an example of the configuration of the information processing device 10 according to the first example embodiment of the present invention. Directions indicated by arrows in the figure are illustrated by way of example only and are not intended to limit the directions of signals between blocks.

Referring to FIG. 1, the information processing device 10 includes a data processing unit 100, a tree structure storing unit 110, a similarity storing unit 120, and an intermediate result storing unit 130. The term "store" used herein means "memorize" or "preserve".

The tree structure storing unit 110 stores data constructed as a tree structure which is a target of processing by the information processing device 10 (the data are hereinafter referred to as a tree structure). The tree structure includes nodes (e.g., a root node and leaf nodes) and an edge. Note that each node includes data (e.g., representative data). The "representative data" are data that represent a node in data included in the node.

The similarity storing unit 120 stores a similarity (e.g., a similarity radius) associated with (assigned to) an edge.

The tree structure storing unit 110 and the similarity storing unit 120 should preliminarily store the above-mentioned data before operations, which are described later, of the data processing unit 100. For example, prior to processing, the user of the information processing device 10 should store the above-mentioned data in each storing unit before the operations.

The intermediate result storing unit 130 stores a later-described result (hereinafter referred to as an "intermediate result") generated based on the grouping processing in each of units of the data processing unit 100.

The data processing unit 100 searches the tree structure stored in the tree structure storing unit 110. Then, the data processing unit 100 executes grouping of the tree structure by using the tree structure stored in the tree structure storing unit 110, a received grouping threshold 140, which is described later, and the similarity stored in the similarity storing unit 120. The data processing unit 100 makes the intermediate result storing unit 130 store the result of grouping processing (intermediate result). Then, after completion of the grouping processing, the data processing unit 100 outputs the intermediate result stored in the intermediate result storing unit 130 as a grouping result 150.

Accordingly, the data processing unit 100 includes a tree search unit 102, a grouping determination unit 103, a subtree grouping unit 104, a leaf node grouping unit 105, an inter-group merging unit 106, and a representative data merging unit 107. Furthermore, the data processing unit 100 includes a grouping threshold reception unit 101 and a grouping result output unit 108. Each component included in the data processing unit 100 uses, as needed, the data stored in the tree structure storing unit 110, the similarity storing unit 120, and the intermediate result storing unit 130. Further, each component makes the intermediate result storing unit 130 store data, as needed. In the following description, for convenience of explanation, an operation in which each component makes each storing unit store data and an operation in which each component reads out data may be omitted.

The grouping threshold reception unit 101 receives the grouping threshold 140 from an external device which is not illustrated. For example, the grouping threshold reception unit 101 should receive the grouping threshold 140 from a device that is operated by the user. The grouping threshold reception unit 101 transfers the grouping threshold 140 to the grouping determination unit 103. Alternatively, the grouping threshold reception unit 101 may transmit the grouping threshold 140 in response to a request from the grouping determination unit 103. In another alternative, the grouping threshold reception unit 101 may store the grouping threshold 140 in a storage unit which is not illustrated. In this case, the grouping determination unit 103 should read out the grouping threshold 140 from the storage unit. Thus, in this example embodiment, there is no limitation on the configuration for storing the grouping threshold 140.

The tree search unit 102 follows the tree structure (tree) stored in the tree structure storing unit 110 in accordance with the structure. Then, the tree search unit 102 requests each of units, which are described later, to perform processing base on a node, data, or an edge which is currently being followed, that is, a node, data, or an edge which is being searched (hereinafter collectively referred to as a "search target").

The grouping determination unit 103 compares the grouping threshold 140 with the similarity (e.g., a similarity radius) associated with the edge (edge to be the search target) of the tree structure which is currently followed by the tree search unit 102. The grouping determination unit 103 determines whether or not a group of nodes associated with the search target edge can be grouped based on the comparison result. In other words, the grouping threshold 140 is a threshold used for determining whether or not grouping can be performed.

The subtree grouping unit 104 groups subtrees that can be grouped. In other words, the subtree grouping unit 104 generates a group by using subtrees that can be grouped. The subtree that can be grouped is a subtree associated with the edge whose similarity is equal to or greater than the grouping threshold 140 by the grouping determination unit 103.

The leaf node grouping unit 105 groups data included in a leaf node. In other words, the leaf node grouping unit 105 generates a group by using data of the leaf node.

The inter-group merging unit 106 merges the groups which can be merged into one group. In other words, the inter-group merging unit 106 edits the groups based on the generated group.

The representative data merging unit 107 merges the representative data into a group to which the representative data belong. In other words, the representative data merging unit 107 edits the groups based on the generated group and the representative data.

The grouping result output unit 108 reads out the intermediate result stored in the intermediate result storing unit 130 and outputs it as the grouping result 150. For example, the grouping result output unit 108 transmits the grouping result 150 to the device that is operated by the user. Alternatively, the grouping result output unit 108 may display the grouping result 150 on a display device which is not illustrated.

[Description of Operation]

Next, the operation of this example embodiment will be described with reference to the drawings.

Figure 2:
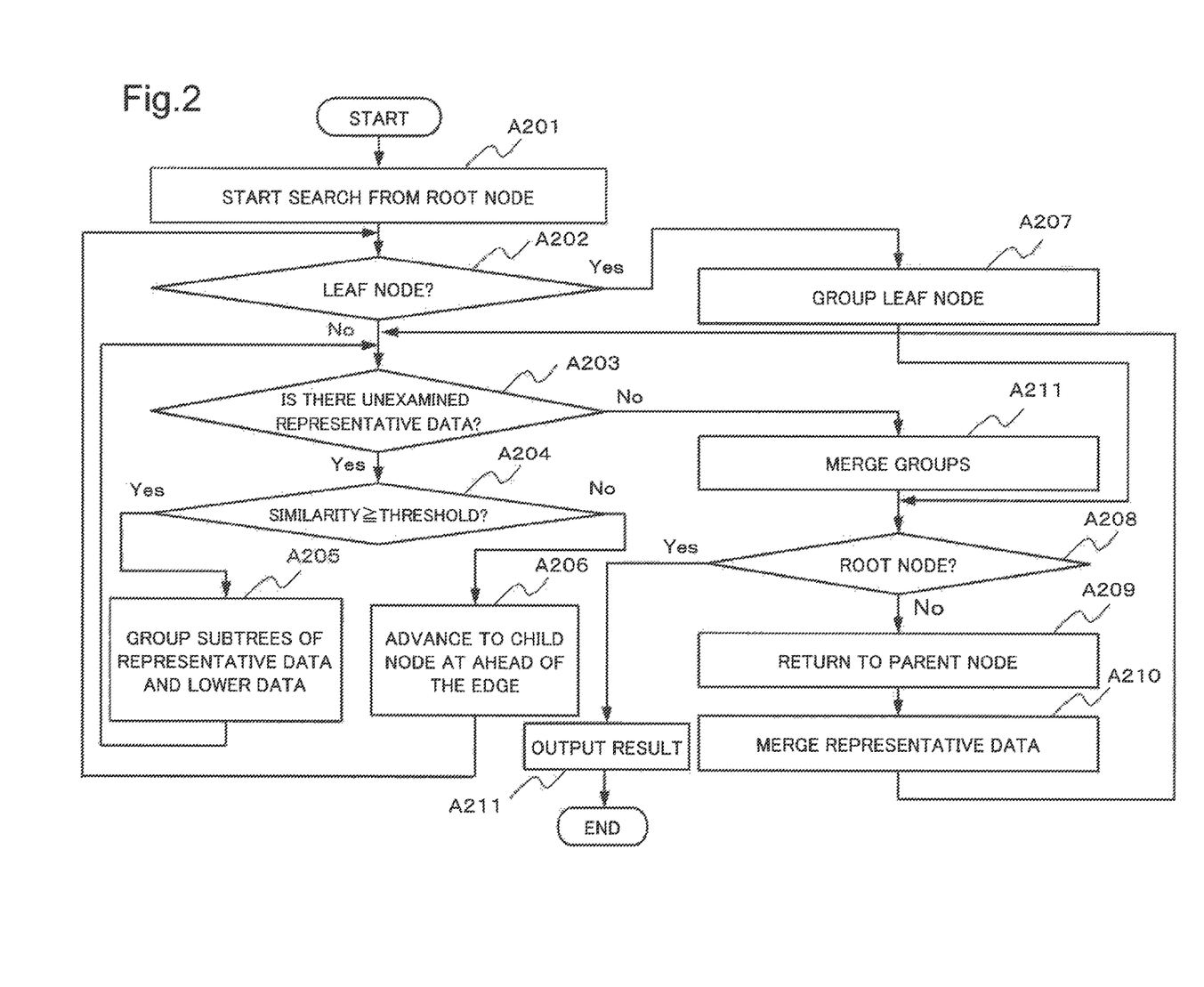
FIG. 2 is a flowchart illustrating an example of an operation of the information processing device according to the first example embodiment.

FIG. 2 is a flowchart illustrating an example of the operation of the information processing device 10 according to this example embodiment.

First, the grouping threshold reception unit 101 receives the grouping threshold 140.

Then, the tree search unit 102 starts search from a root node in the tree structure stored in the tree structure storing unit 110 (step A201).

The tree search unit 102 determines whether or not the current node is a leaf node (step A202).

When the current node is not a leaf node (No in step A202), the tree search unit 102 determines whether unexamined representative data are present in the node (step A203).

When the unexamined representative data are present (Yes in step A203), the tree search unit 102 selects one piece of the representative data from among the unexamined representative data. Then, the tree search unit 102 requests the grouping determination unit 103 to perform processing.

The grouping determination unit 103 determines (examines) whether the similarity associated with the edge of the selected representative data is equal to or greater than the grouping threshold 140 by referring the similarity stored in the similarity storing unit 120 (step A204). The grouping determination unit 103 returns the determination result to the tree search unit 102.

When the similarity of the representative data is equal to or greater than the grouping threshold 140 (Yes in step A204), data in a lower node of the representative data have a similarity that is equal to or greater than the grouping threshold 140 from the representative data. Accordingly, the tree search unit 102 requests the subtree grouping unit 104 to perform processing based on the determination result. The subtree grouping unit 104 groups (generates a group) the representative data and data in lower nodes of the representative data. Then, the subtree grouping unit 104 outputs the result (group information) to the intermediate result storing unit 130 (step A205). Then, the operation of the information processing device 10 returns to step A203. Note that a subtree including the representative data and the data in lower nodes of the representative data is referred to as a "subtree of the representative data and lower data".

When the similarity of the representative data is smaller than the grouping threshold 140 (No in step A204), the tree search unit 102 moves the search target to a child node located at ahead of the edge (step A206). Then, the tree search unit 102 returns to step A202 and repeats a similar operation.

When the search reaches a leaf node (Yes in step A202), the tree search unit 102 requests the leaf node grouping unit 105 to perform processing. The leaf node grouping unit 105 groups (generates a group) data in the leaf node. Then, the leaf node grouping unit 105 makes the intermediate result storing unit 130 store the result (group information) (step A207). Note that the leaf node grouping unit 105 groups a leaf node into one or a plurality of groups. In other words, the leaf node grouping unit 105 generates one or a plurality of groups based on grouping of leaf node.

Then, the tree search unit 102 determines whether or not the current node (in this case, a leaf node) is a root node (step A208).

When the current node is not a root node (No in step A208), the search by the tree search unit 102 returns to an upper node (parent node) (back track) (step A209).

When the search by the tree search unit 102 returns to an upper node, the representative data in the node do not belong to any group. Accordingly, the tree search unit 102 requests the representative data merging unit 107 to perform processing. The representative data merging unit 107 merges the representative data into an appropriate group to which the representative data belong among the groups generated with lower nodes (subtrees) of the representative data (step A210). This operation will be described in detail later. Note that when there is no group to which the representative data belong, the representative data merging unit 107 generates a group based on the representative data. The representative data merging unit 107 makes the intermediate result storing unit 130 store the processing result (group information). Then, the information processing device 10 returns to step A203.

When all the representative data in the node have been examined (No in step A203), the information processing device 10 is a state in which the result of grouping of lower nodes of the node is generated. Accordingly, the tree search unit 102 requests the inter-group merging unit 106 to perform processing. The inter-group merging unit 106 merges the groups, which can be merged in the generated grouping result 150, into one group (step A211). Details of this operation will be described later. The inter-group merging unit 106 makes the intermediate result storing unit 130 store the processing result.

After that, the information processing device 10 proceeds to step A208 and executes the above-described operation.

Then, the information processing device 10 repeats the above-described operation until the search target of the tree search unit 102 returns to the root node. Then, when the tree search unit 102 determines that the node being searched is the root node (Yes in step A208), the tree search unit 102 requests the grouping result output unit 108 to perform processing. The grouping result output unit 108 outputs the grouping result 150 (step A211).

Then, the information processing device 10 terminates the grouping operation.

[Description of Advantageous Effects]

Next, advantageous effect of this example embodiment will be described.

As described above, the information processing device 10 according to this example embodiment can provide an advantageous effect that grouping of data can be achieved without the need for limiting data to be processed.

This is because, as described above, the information processing device 10 eliminates the need for limiting data to be processed in the operation.

The information processing device 10 according to this example embodiment can provide another advantageous effect that the grouping operation can be executed with a reduced operation time.

The reasons for the above are as follows.

For node determined to be grouped by the grouping determination unit 103 in the nodes searched by the tree search unit 102, each of units executes the following grouping processing.

That is, the subtree grouping unit 104 groups subtrees of the representative data whose similarity associated with an edge is equal to or greater than the grouping threshold 140 and lower data (representative data and data in lower nodes of the representative data). In this case, the information processing device 10 can eliminate the need for processing in lower node (child node) of the edge. This is a first reason.

When the search by the tree search unit 102 reaches a leaf node, the leaf node grouping unit 105 groups the leaf node.

After the grouping processing described above, when the search by the tree search unit 102 returns to an upper node (back track), the representative data merging unit 107 merges the representative data into an appropriate group.

Then, the inter-group merging unit 106 merges the groups that can be merged in the grouping result.

A general information processing device that searches a tree structure searches at least some of subtree structures of a tree structure a plurality of times.

On the other hand, as described above, the information processing device 10 can achieve the above-described grouping operation based on one tree structure search by the tree search unit 102. This is a second reason.

Note that a calculation for grouping by the leaf node grouping unit 105 occurs when the search by the tree search unit 102 advances to a leaf node. In this example embodiment, as described above, leaf nodes which are target of calculation are some of leaf nodes. Further, the calculation in the leaf node is a calculation using data included in the leaf node. Accordingly, the amount of calculation for the leaf node in this example embodiment is not a large calculation amount.

[Detailed Description of Operation]

Next, a detailed operation of this example embodiment will be described by using a specific tree structure.

Prior to a detailed description of the operation, data which are stored in the tree structure storing unit 110 and the similarity storing unit 120 and are used in the explanation of the operation will be described.

Figure 3:
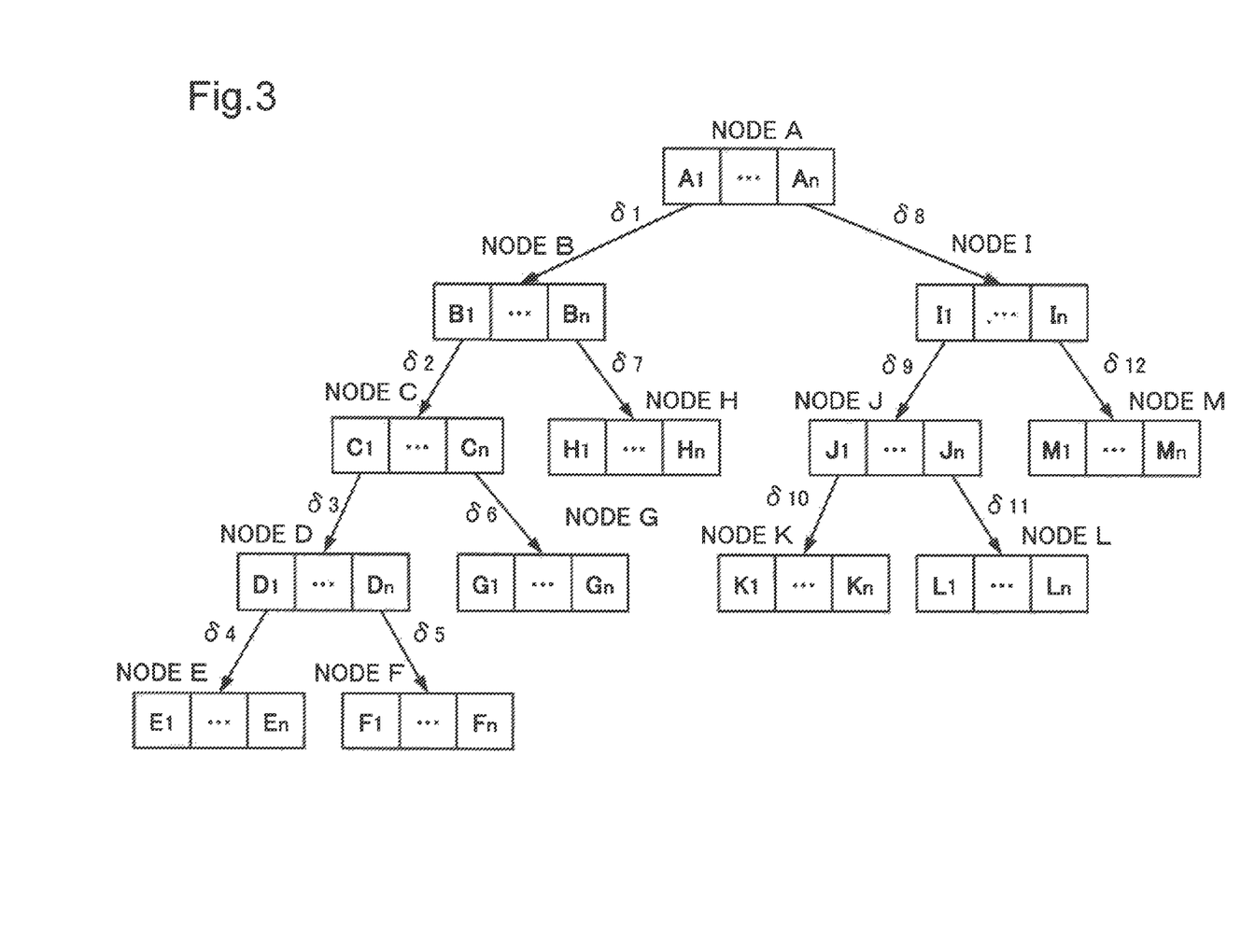
FIG. 3 is a diagram illustrating a tree structure used to explain the operation of the first example embodiment.

FIG. 3 is a diagram illustrating a tree structure of the data used in the explanation of the operation of the first example embodiment.

The tree structure illustrated in FIG. 3 is, for example, a hierarchy structure generated based on a similarity of data by using the technique described in NPL 1.

A rectangle illustrated in FIG. 3 represents a node. Each of the nodes (node A to node M) includes n pieces of representative data (e.g., the representative data of the node A are $A_1$ to $A_n$). In FIG. 3, even though all the nodes include n pieces of representative data, this represents one example. In this example embodiment, a number of pieces of data included in a node may be different for each node.

An edge is illustrated by an arrow pointing from data of a parent node to a child node. A similarity $\delta_x$ (x=1, . . . , 12) associated with an edge illustrates that data, whose similarity is equal to or greater than the similarity $\delta_x$ from data of a parent node, exist in a lower node of the edge. For example, for data ($B_1, \ldots, B_n, C_1, \ldots, C_n, \ldots$ and the like in FIG. 3) of lower nodes from the edge associated with a similarity $\delta_1$ from the data $A_1$, similarities to the data $A_1$ are equal to or greater than the similarity $\delta_1$.

It is assumed in the following description that the tree structure storing unit 110 preliminarily stores the tree structure illustrated in FIG. 3. Further, it is assumed that the similarity storing unit 120 preliminarily stores the similarity illustrated in FIG. 3 with associating to the tree structure.

The method of storing the tree structure in the tree structure storing unit 110 of this example embodiment is not particularly limited. For example, as a method of storing the tree structure, it is supposed for a method to store a node ID (e.g., A to M illustrated in FIG. 3), data belonging to the node, and data which represent which subtree of representation each of data is with a table-format or an object-format.

The method of storing the similarity (e.g., a similarity radius) in the similarity storing unit 120 of this example embodiment is not particularly limited. Since the similarity storing method depends on the method of storing the tree structure, the similarity storing method should be determined based on the tree structure. However, the method of storing the tree structure is a method in which an edge is associated with a similarity which is associated with the edge. For example, as the method of storing similarity, a method in which a node which makes refers to a subtree stores the similarity associated with representative data, or a method in which a root node of a subtree stores the edge associated with the similarity is supposed. Alternatively, as a method of storing similarity, a method in which an edge object which connects between representative data and a root node of a subtree stores a similarity inside, a method in which an edge object stores a similarity associated with an edge ID, or the like is supposed.

Furthermore, the method of storing the intermediate result according to this example embodiment is not particularly limited. However, as the method of storing the intermediate result, a data structure such as a stack is desirable. This is because of the following reasons. However, the data structure, such as a stack, is a data structure in which last input data are first output (LIFO: Last In, First Out). The data structure, such as a stack, is hereinafter referred to simply as a "stack". The amount of data stored in the stack is referred to as a height of the stack.

In extraction of a candidate for a group to which the representative data belong and extraction of groups to be merged in the inter-group merging, the information processing device 10 need to extract the intermediate result (group information) generated for a lower node of target node (current node). When the intermediate result storing unit 130 stores the intermediate result by using the data structure (LIFO) such as a stack, the information processing device 10 can achieve the extraction by examining the data stacked in the stack as a search of the tree structure in the above extraction.

Note that in the following description, descriptions of storing operation and reading operation of each of information for each component may be appropriately omitted. Further, in the following description, it is assumed that the information processing device 10 receives a threshold $\delta_q$ as the grouping threshold 140. That is, the information processing device 10 uses the threshold $\delta_q$ as a criterion for grouping of data and generates (extracts) a group which includes data whose similarities are equal to or greater than the threshold $\delta_q$.

Next, a specific operation of the information processing device 10 will be described.

The outline of the operation of grouping data based on a search of a tree structure in the information processing device 10 of this example embodiment will be described below.

First, the tree search unit 102 starts a search of a tree structure from a root node (step A201). As illustrated in FIG. 3, in this case, the root node is node A. The node A includes n pieces of representative data $A_1$ to $A_n$.

The tree search unit 102 determines whether or not the node A is a leaf node (step A202).

In this case, since the node A is not a leaf node (No in step A202), the tree search unit 102 determines whether or not unexamined representative data are present (step A203).

Here, as one example case in which that unexamined representative data are present, the tree search unit 102 selects the representative data $A_1$ (Yes in step A203).

Next, the grouping determination unit 103 compares the threshold $\delta_q$ with the similarity $\delta_1$ associated with the edge that connects the representative data $A_1$ and a node B including representative data $B_1$ to $B_n$ (step A204).

When the similarity ($\delta_1$) associated with the edge is smaller than the threshold $\delta_q$ ($\delta_1 < \delta_q$) (No in step A204), the tree search unit 102 moves a search target node to a child node (in this case, the node B) ahead of the edge (step A206). In this case, it is assumed that a similarity relation is represented as $\delta_1 < \delta_q$. Accordingly, the tree search unit 102 makes the search target the node B. Based on this operation, the tree search unit 102 searches an edge which is associated with a similarity that is equal to or greater than $\delta_q$.

On the other hand, when the similarity ($\delta_1$) associated with the edge is equal to or greater than the threshold $\delta_q$ ($\delta_1 \geq \delta_q$) (Yes in step A204), the subtree grouping unit 104 generates a subtree group (step A205).

Figure 4:
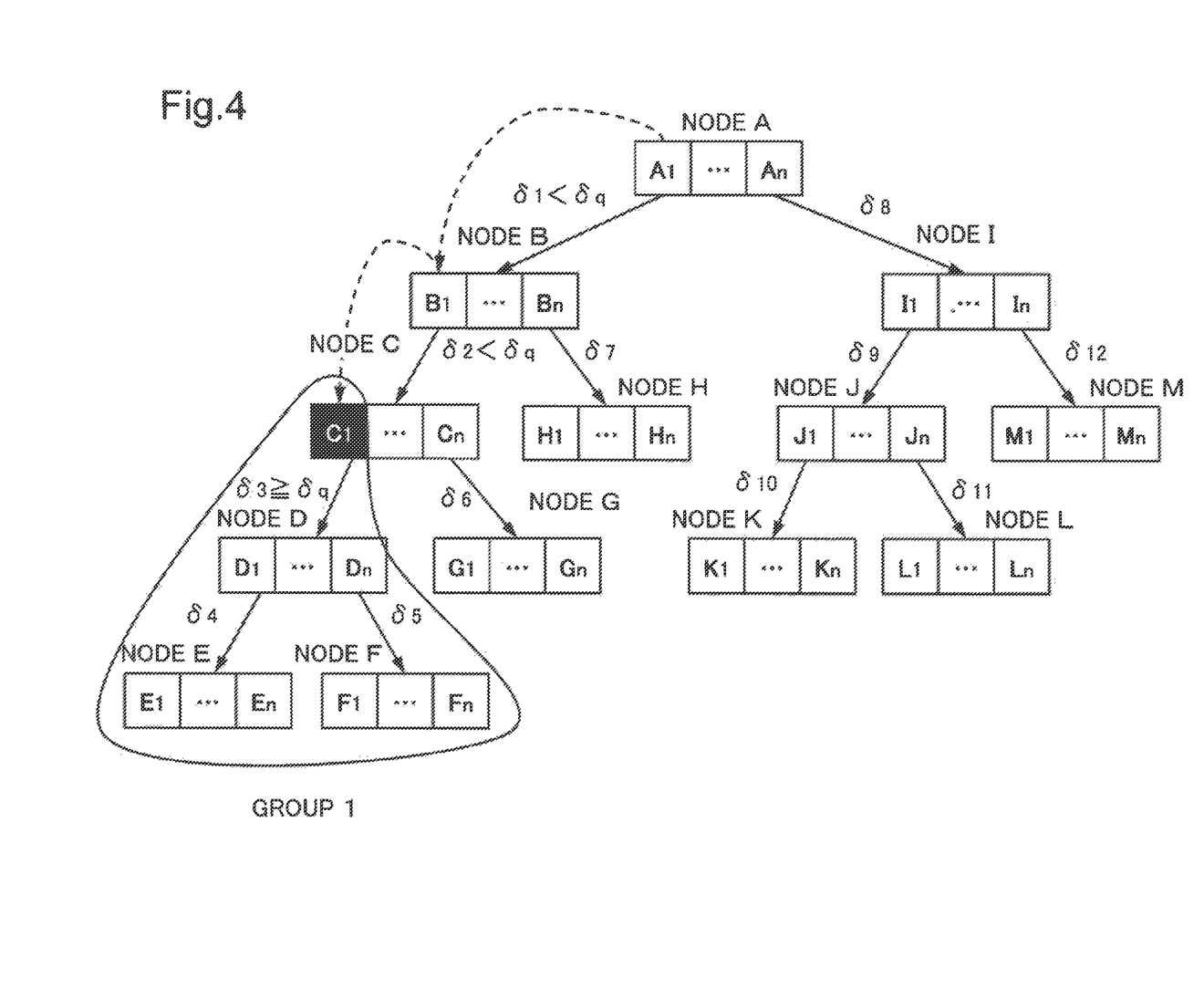
FIG. 4 is a diagram illustrating an example of grouping of subtrees.

FIG. 4 is a diagram illustrating an example of grouping of subtrees.

As illustrated in FIG. 4, it is assumed that similarity $\delta_3$ associated with an edge between a node D and data $C_1$ of a node C is equal to or greater than the threshold $\delta_q$ ($\delta_3 \geq \delta_q$). In this case, the grouping determination unit 103 determines that the similarity associated with the edge is equal to or greater than the threshold $\delta_q$ (Yes in step A204). That is, in this case, data under the data $C_1$ have similarities that are equal to or greater than the threshold $\delta_q$ with criterion of the data $C_1$.

Accordingly, the subtree grouping unit 104 groups the subtrees of the representative data $C_1$ and lower data as a group (group 1 illustrated in FIG. 4). Then, the subtree grouping unit 104 outputs the generated group to the intermediate result storing unit 130 as the intermediate result (step A205).

As illustrated in FIG. 4, the nodes included in the subtrees of the representative data $C_1$ and lower data are grouped as group 1. Therefore, the information processing device 10 does not need to search nodes which are located in the side of a leaf from the representative data $C_1$ (and data included in the node). Accordingly, the tree search unit 102 selects the next representative data $C_2, \ldots, C_n$. Then, the grouping determination unit 103 similarly determines whether or not there is an edge whose similarity is equal to or greater than the threshold $\delta_q$.

If the grouping determination unit 103 does not find any edge which is equal to or greater than the threshold $\delta_q$ and the search by the tree search unit 102 reaches a leaf node, the leaf node grouping unit 105 groups the leaf node (step A207).

Figure 5:
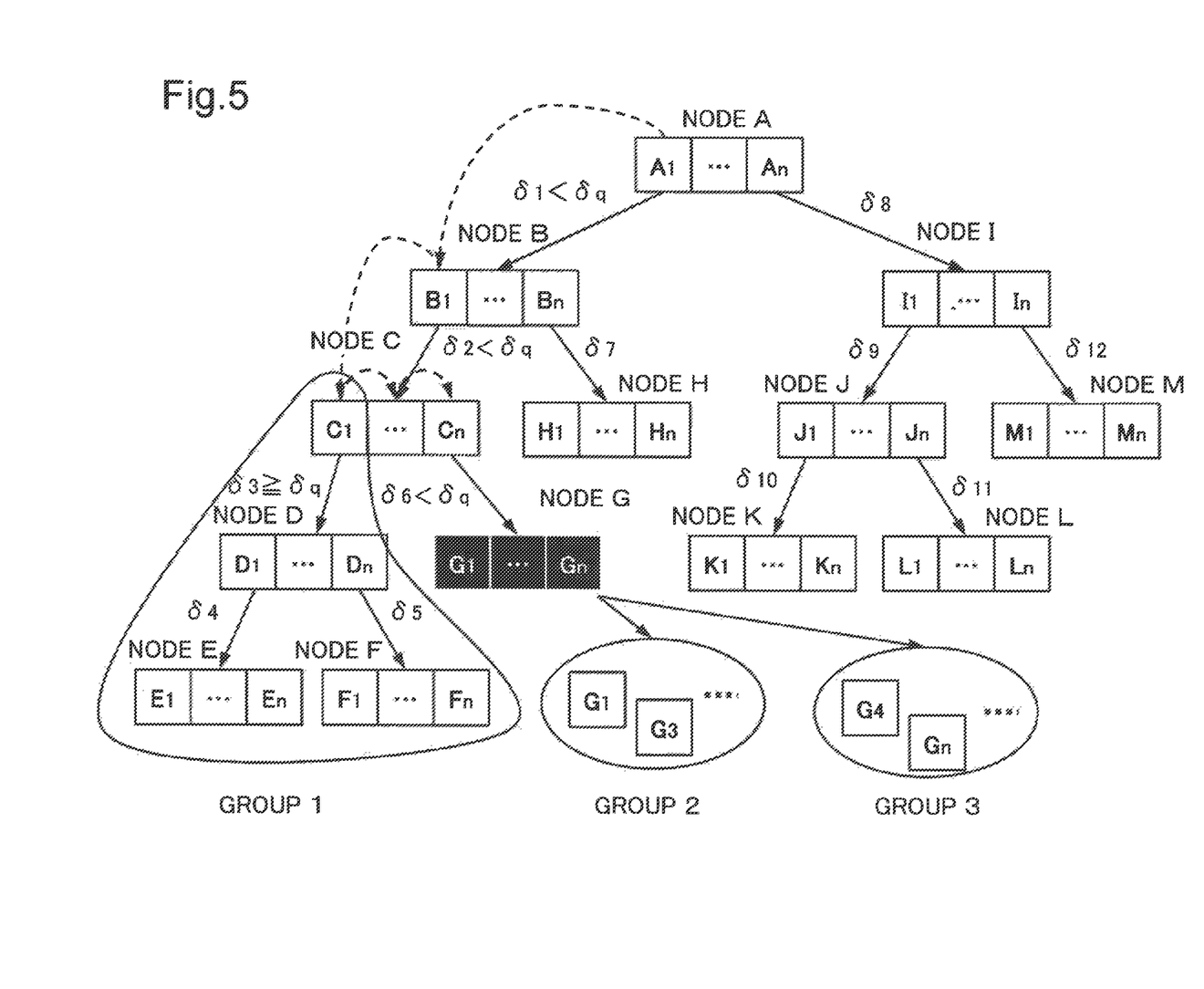
FIG. 5 is a diagram illustrating an example of grouping of leaf nodes.

FIG. 5 is a diagram illustrating an example of grouping of leaf node.

As illustrated in FIG. 5, it is assumed that the search by the tree search unit 102 advances to the node G. Then, the leaf node grouping unit 105 groups the leaf node (node G) into, for example, two groups (groups 2 and 3) so as to satisfy the threshold $\delta_q$.

Note that the processing of the leaf node grouping unit 105 is not particularly limited. However, in order to group the leaf node, the leaf node grouping unit 105 need to examine the data in the leaf nodes in detail. Accordingly, for example, the leaf node grouping unit 105 may group the leaf node by using the method described in PTL 1.

Note that when grouping the leaf node, the target data to be grouped is suppressed by the capacity of node and whose number is sufficiently small. Therefore, even when the amount of calculation in the leaf node grouping unit 105 is required the order of O ($n^2$) for n pieces of data, the entire calculation amount in the information processing device 10 is not large amount, and is amount to be possible to process at sufficiently high speed.

Further, processing for grouping for the leaf node in the leaf node grouping unit 105 is not particularly limited. Various variations can be supposed for grouping leaf node according to this example embodiment. For example, when a leaf node does not include a predetermined number of pieces of data, the leaf node grouping unit 105 need not generate a group for the leaf node. Alternatively, when the leaf node does not include the predetermined number of pieces of data, the leaf node grouping unit 105 may exclude the leaf node from the grouping target.

The tree search unit 102 executes a back track to an upper node in the tree structure after executing grouping of the subtree relating to the edge whose similarity is equal to or greater than the threshold $\delta_q$ or grouping of leaf node (step A209). When the tree search unit 102 visits the representative data in the back track operation of the search by the tree search unit 102 ((last) in order of back), the representative data merging unit 107 merges representative data which are still not determined a group to belong (step A210). Further, the inter-group merging unit 106 executes merging of groups (step A211).

Figure 6:
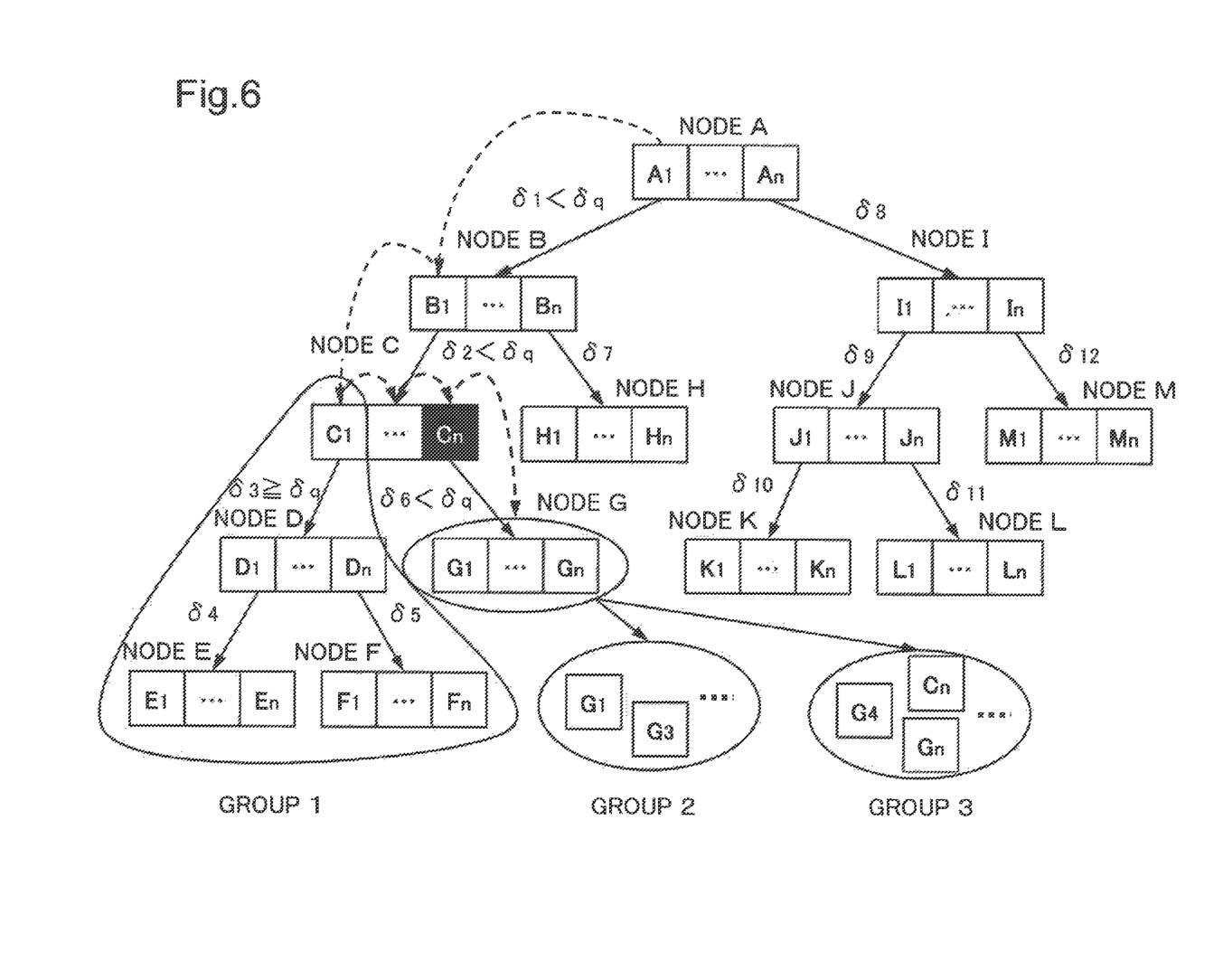
FIG. 6 is a diagram illustrating an example of merging of representative data.

FIG. 6 is a diagram illustrating an example of merging of representative data. Merging of representative data $C_n$ will be described with reference to FIG. 6.

The representative data $C_n$ are representative for data in a lower node of the representative data $C_n$. Accordingly, the representative data merging unit 107 examines which group the representative data $C_n$ belong to among the groups generated in the lower node of the representative data $C_n$.

Note that as already described above, when the intermediate result storing unit 130 stores candidates (intermediate results) for groups to be examined in the stack structure, the representative data merging unit 107 can narrow down the candidate for the group if so examining a number group candidates corresponding to the height of the stack. In other words, the representative data merging unit 107 may make, as examination candidates, groups up to the height stacked in the stack when visiting the representative data (first) in order of forward in the search by the tree search unit 102.

Then, the representative data merging unit 107 compares the similarity of the representative data of the candidate groups with similarity of the representative data ($C_n$) to be grouped. Then, the representative data merging unit 107 may merge the group with the highest similarity and the representative data ($C_n$). However, the representative data merging unit 107 may merge the representative data ($C_n$) with the group in such a way that the similarity becomes equal to or greater than the threshold $\delta_q$.

In the example illustrated in FIG. 6, a group, which already exists when the tree search unit 102 visits in order of forward, is group 1. Further, groups, which exist when the tree search unit 102 visits in order of back are groups 1, 2, and 3. That is, the representative data merging unit 107 can determine that group 2 or group 3 as the difference is a group generated in the lower node from the representative data $C_n$. Accordingly, the representative data merging unit 107 should examine which one of group 2 and group 3 is more appropriate for the representative data $C_n$. FIG. 6 illustrates that the representative data $C_n$ is merged into group 3.

However, the above description is not intended to limit the case where the representative data merging unit 107 uses the stacked data. The representative data merging unit 107 may use data other than the stack structure.

In the inter-group merging operation, the inter-group merging unit 106 can narrow down the candidates for the groups which are examined as to whether or not the groups can be merged, in a manner similar to the operation of merging representative data. That is, in the tree search, the inter-group merging unit 106 should make groups up to the height of the stack when visiting nodes (first) in order of forward merge targets. Note that the inter-group merging unit 106 may select, as the inter-group merging method, a method of merging depending on the properties of the data to be merged. For example, the inter-group merging unit 106 may merge groups simply when the similarities of representative data between the groups is equal to or greater than similarity which is added the similarities of groups respectively.

Figure 7:
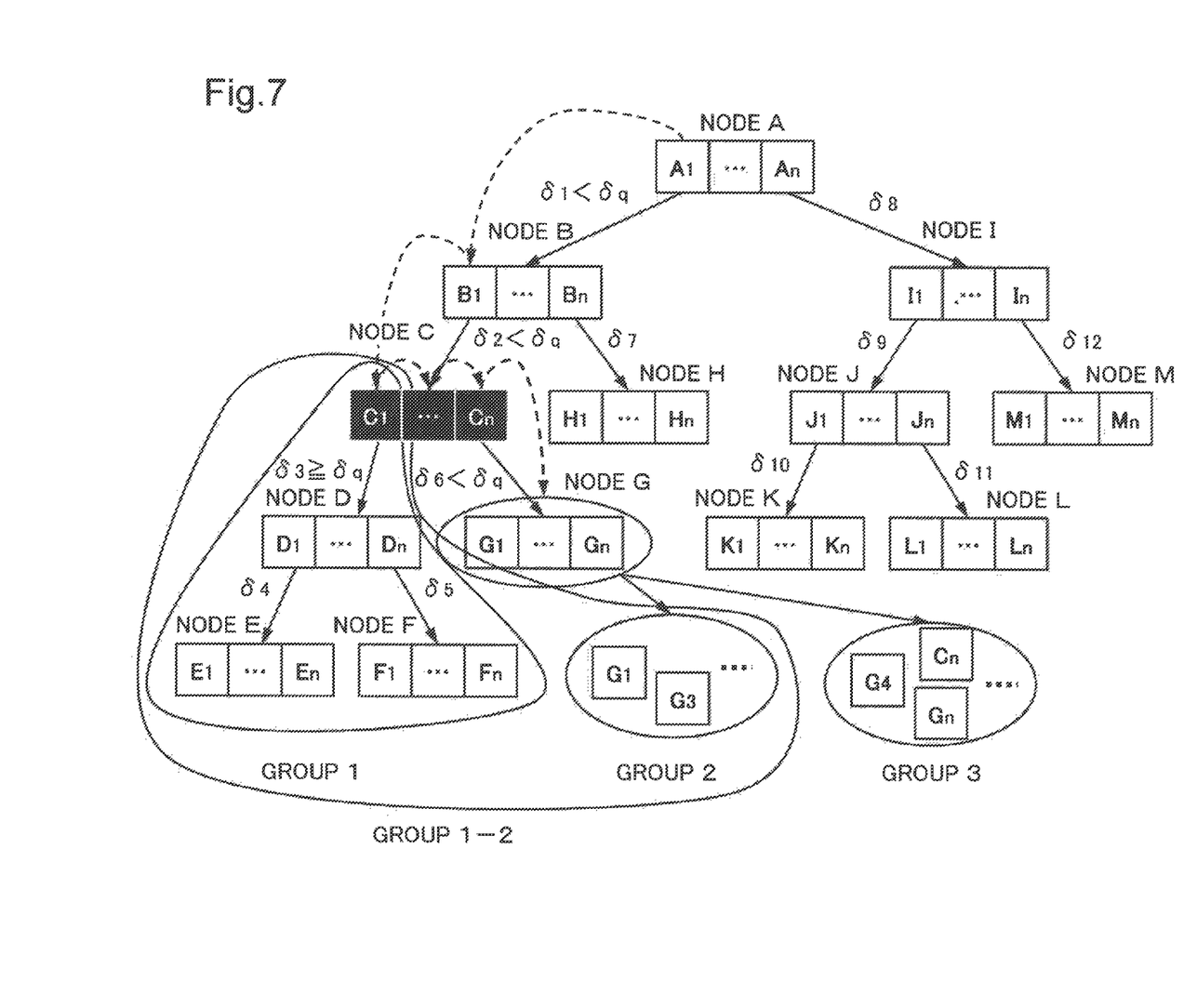
FIG. 7 is a diagram illustrating an example of merging of groups.

FIG. 7 is a diagram illustrating an example of merging of groups.

As illustrated in FIG. 7, there is no group when the tree search unit 102 visits the nodes including $C_1$ to $C_n$ in order of forward. On the other hand, when the tree search unit 102 visits in order of back, groups are groups 1, 2, and 3. Accordingly, the inter-group merging unit 106 compares the groups and examines whether or not the groups can be merged. The example illustrated in FIG. 7 shows that group 1 and group 2 are merged and group 1-2 is generated.

However, the above example is not intended to limit the case where the inter-group merging unit 106 uses the stacked data. The inter-group merging unit 106 may use data other than the stack structure. Further, the operation timing of the inter-group merging unit 106 is not limited before the operation of the grouping result output unit 108. For example, the inter-group merging unit 106 may merge groups after the search by the tree search unit 102 returns to a root node.

Until there is no unprocessed representative data in the root node (end) when returning to the root node, the tree search unit 102 executes the search of the tree structure by repeating the above-described operation. Then, when the tree search unit 102 completes the search of the tree structure, the grouping result output unit 108 outputs the grouping result 150 (step A211).

<First Modified Example>

The information processing device 10 described above is configures as described below.

For example, each of component units of the information processing device 10 may be composed of a hardware circuit.

Alternatively, the information processing device 10 may be configured using a plurality of devices in which each component is connected via a network, a bus, or the like (hereinafter collectively called "a network or the like").

Figure 8:
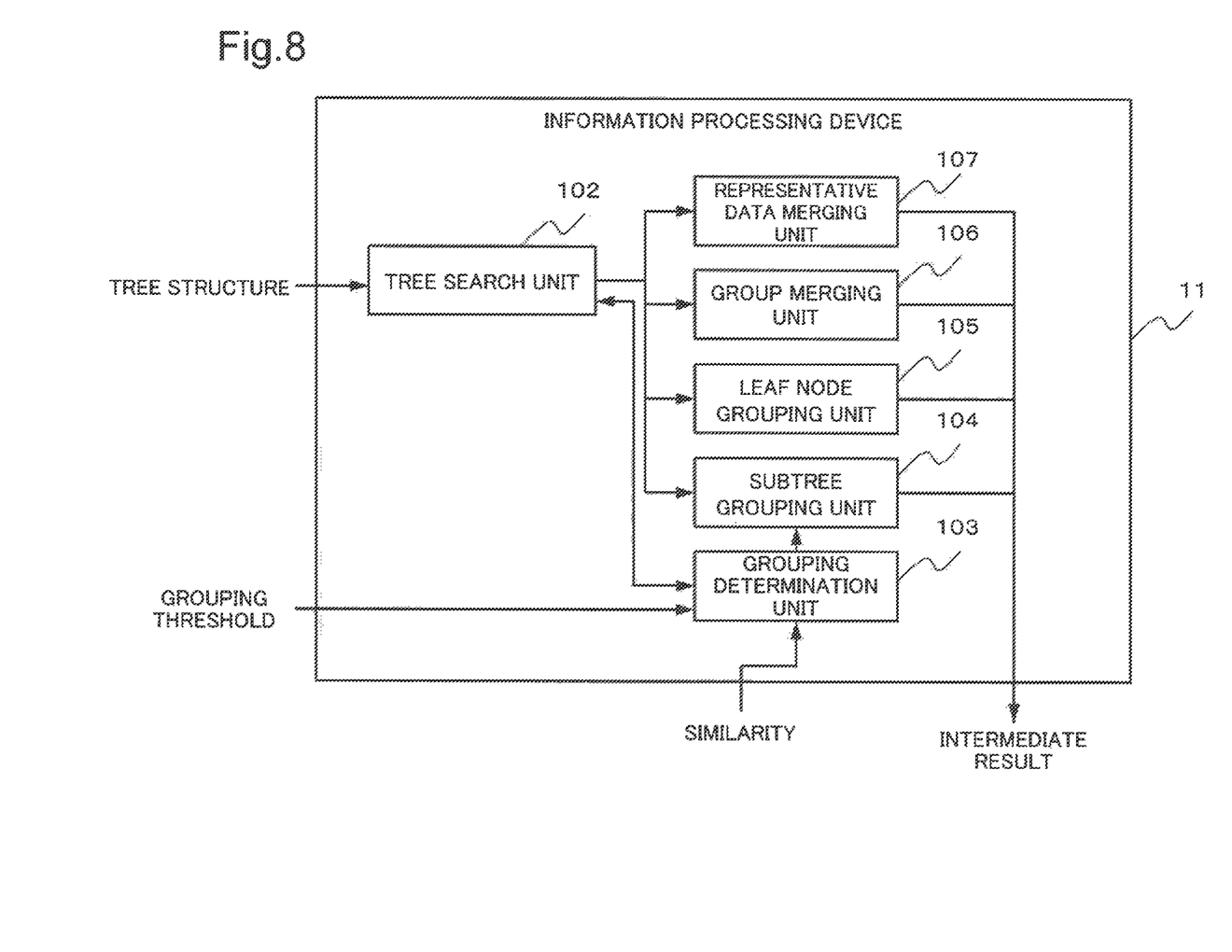
FIG. 8 is block units illustrating an example of a configuration of a modified example of the information processing device of the first example embodiment.

FIG. 8 is a block diagram illustrating an example of a configuration of an information processing device 11 according to a modified example of this example embodiment. However, directions indicated by arrows in the figure are illustrated by way of example only and are not intended to limit the directions of signals between blocks.

The information processing device 11 includes the tree search unit 102, the grouping determination unit 103, the subtree grouping unit 104, the leaf node grouping unit 105, the inter-group merging unit 106, and the representative data merging unit 107. Each of components of the information processing device 11 is connected to each of the grouping threshold reception unit 101, the tree structure storing unit 110, the similarity storing unit 120, and the intermediate result storing unit 130, which are not illustrated in FIG. 8, via a network or the like which is not illustrated. Further, each of components of the information processing device 11 operates in a manner similar to that of each of components of the information processing device 10. Note that the grouping result output unit 108, which is not illustrated, may retrieve the grouping result 150 from the intermediate result storing unit 130 after the operation of the information processing device 11.

The information processing device 11 having the configuration as described above can provide advantageous effects similar to those of the information processing device 10.

This is because, as described above, each of components of the information processing device 11 operates in a manner similar to those of components of the information processing device 10 and is capable of executing grouping.

Note that the information processing device 11 is a minimum configuration of the example embodiment of the present invention.

<Second Modified Example>

Alternatively, in the information processing device 10, a plurality of components is configured with one piece of hardware.

Alternatively, the information processing device 10 may be realized as a computer device including a CPU (Central Processing Unit), a ROM (Read Only Memory), and a RAM (Random Access Memory). The information processing device 10 may be realized as a computer device further including an input and output circuit (IOC) and a network interface circuit (NIC) in addition to the above-mentioned configuration.

Figure 9:
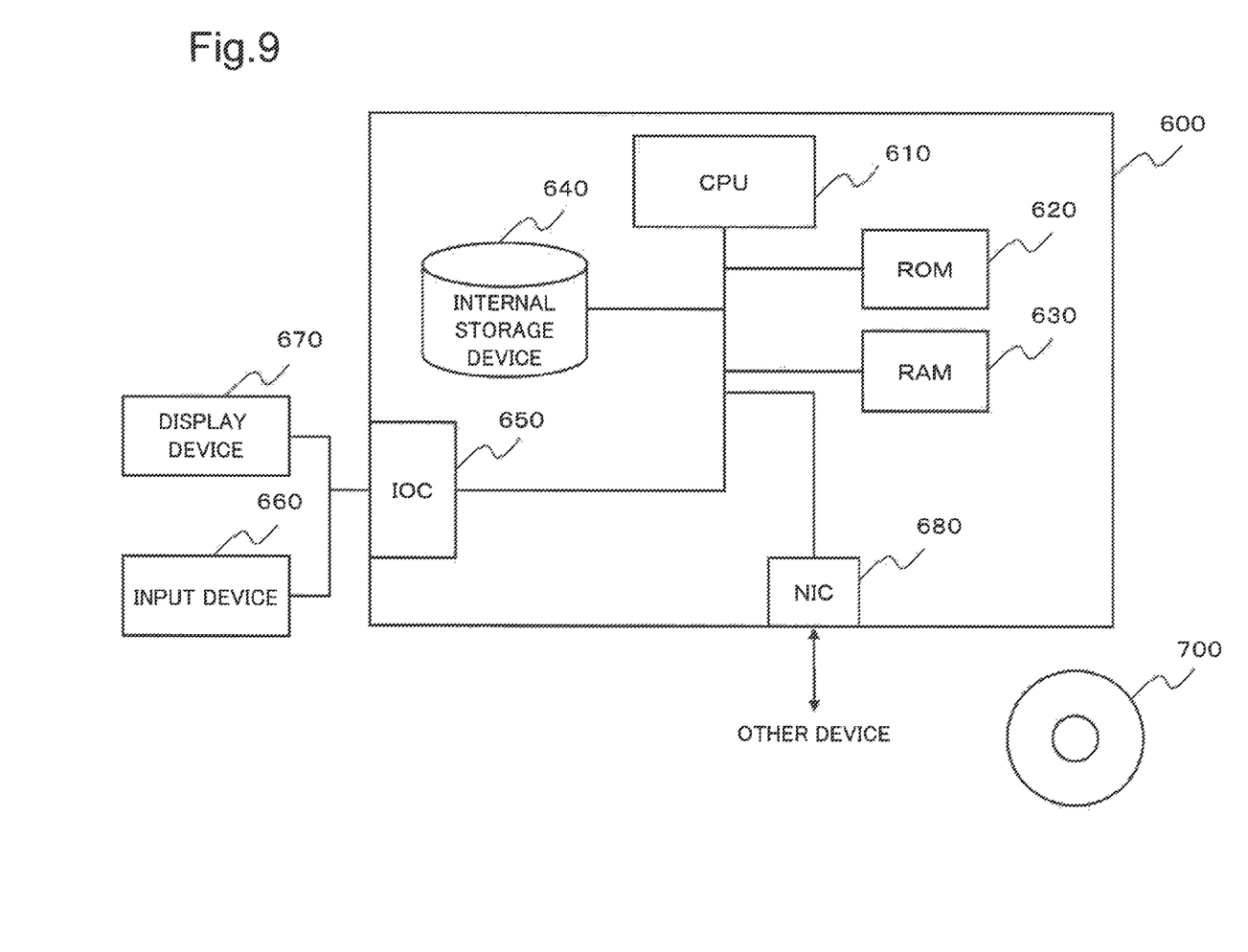
FIG. 9 is block units illustrating an example of a configuration of another modified example of the information processing device of the first example embodiment.

FIG. 9 is a block diagram illustrating an example of the configuration of an information processing device 600 which is a second modified example of the information processing device 10.

The information processing device 600 includes a CPU 610, a ROM 620, a RAM 630, an internal storage device 640, an IOC 650, and an NIC 680, and constitutes a computer device.

The CPU 610 reads a program from the ROM 620. Then, the CPU 610 controls the RAM 630, the internal storage device 640, the IOC 650, and the NIC 680 based on the read program.

Then, the computer including the CPU 610 controls these components and realizes each of functions as each of units illustrated in FIG. 1. The units illustrated in FIG. 1 are the grouping threshold reception unit 101, the tree search unit 102, the grouping determination unit 103, the subtree grouping unit 104, the leaf node grouping unit 105, the inter-group merging unit 106, the representative data merging unit 107, and the grouping result output unit 108 respectively.

The CPU 610 may use the RAM 630 or the internal storage device 640 as a temporary storage for the program when realizing each of functions.

Alternatively, the CPU 610 may read a program included in a storage medium 700 which store a computer readable program, by using a storage medium reader which is not illustrated. Alternatively, the CPU 610 may receive a program from an external device, which is not illustrated, via the NIC 680, store the program in the RAM 630, and operate based on the stored program.

The ROM 620 stores a program executed by the CPU 610 and fixed data. The ROM 620 is, for example, a P-ROM (Programmable-ROM) or a flash ROM.

The RAM 630 temporarily stores a program executed by the CPU 610 and data. The RAM 630 is, for example, a D-RAM (Dynamic-RAM).

The internal storage device 640 stores data and a program that are stored by the information processing device 600 for a long period of time. Further, the internal storage device 640 may operate as a temporary storage device for the CPU 610. The internal storage device 640 is, for example, a hard disk device, a magneto-optical disk device, an SSD (Solid State Drive), or a disk array device. The internal storage device 640 operates as the tree structure storing unit 110, the similarity storing unit 120, and the intermediate result storing unit 130.

The ROM 620 and the internal storage device 640 are non-transitory storage media. On the other hand, the RAM 630 is a transitory storage medium. The CPU 610 can operate based on a program stored in the ROM 620, the internal storage device 640, or the RAM 630. In other words, the CPU 610 can operate by using a non-transitory storage medium or a transitory storage medium.

The IOC 650 intermediates data between the CPU 610, and an input device 660 and a display device 670. The IOC 650 is, for example, an IO interface card or a USB (Universal Serial Bus) card.

The input device 660 is equipment that receives an input instruction from the operator of the information processing device 600. The input device 660 is, for example, a keyboard, a mouse, or a touch panel. The input device 660 may operate as the grouping threshold reception unit 101.

The display device 670 is equipment that displays information to the operator of the information processing device 600. The display device 670 is, for example, a liquid crystal display. The display device 670 may operate as the grouping result output unit 108.

The NIC 680 relays data exchange with an external device, which is not illustrated, via a network. The NIC 680 is, for example, a LAN (Local Area Network) card. The NIC 680 may operate as the grouping threshold reception unit 101 or the grouping result output unit 108.

The information processing device 600 to be configured as described above can provide advantageous effects similar to those of the information processing device 10.

This is because the CPU 610 of the information processing device 600 can realize functions similar to those of the information processing device 10 based on the program.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-209936, Oct. 14, 2014, the disclosure of which is incorporated herein in its entirety by reference.

INDUSTRIAL APPLICABILITY

The present invention can be applied to use for the summarization of data such as an image, a video, and a document.

REFERENCE SIGNS LIST

10 Information processing device
11 Information processing device
100 Data processing unit
101 Grouping threshold reception unit
102 Tree search unit
103 Grouping determination unit
104 Subtree grouping unit
105 Leaf node grouping unit
106 Inter-group merging unit
107 Representative data merging unit
108 Grouping result output unit
110 Tree structure storing unit
120 Similarity storing unit
130 Intermediate result storing unit
140 Grouping threshold
150 Grouping result
600 Information processing device
610 CPU
620 ROM
630 RAM
640 Internal storage device
650 IOC
660 Input device
670 Display device
680 NIC
700 Storage medium

The invention claimed is:

1. An information processing device comprising:
a memory configured to store one or more instructions; and
a hardware processor configured to execute the one or more instructions to:
search data in a tree structure which has plurality of nodes including data as an element by traversing the tree structure stored in a storage;
determine, based on a similarity associated with an edge between a first node, which is one of a plurality of upper nodes among the plurality of nodes, of a search target and a second node, which is one of a plurality of lower nodes among the plurality of nodes of the tree structure and a predetermined threshold, whether or not to form a first group using first data of the first node and second data of the second node;
generate the first group by grouping the first data and the second data which are determined to be grouped as a result of the determination;
generate, when the first node of the search target is a leaf node, one or a plurality of second groups by grouping the leaf node of the search target;
after generating the first and the second groups, traverse the tree structure in a reverse manner by back tracking from one of the lower nodes to one of the upper nodes and, when third data returned while traversing the tree structure in the reverse manner from said one of the lower nodes to said one of the upper nodes is not determined to belong to any one of first and second groups of the lower nodes, merge the third data into any one of the first and second groups of the lower nodes; and
merge at least two of the first and second groups of the lower nodes.

2. The information processing device according to claim 1, wherein the hardware processor is further configured to:
store a similarity associated with the data in the tree structure, wherein a range of the similarity set to a larger value is lower in the tree structure;
receive the predetermined threshold used for the grouping determination;
store the generated or merged group which is an intermediate result; and
output the group stored in the intermediate result storing unit as a grouping result.

3. The information processing device according to claim 2, wherein the hardware processor is further configured to store the intermediate result by using a stack structure.

4. The information processing device according to claim 3, wherein the hardware processor is further configured to process the data using data stacked in the stack structure.

5. The information processing device according to claim 1, wherein the hardware processor is further configured to generate a group using the representative data when there is no group available.

6. An information processing method comprising:
searching data in a tree structure which has a plurality of nodes including data as an element by traversing the tree structure stored in a storage;
determining, based on a similarity associated with an edge between first node, which is one of a plurality of upper nodes among the plurality of nodes, of a search target and a second node, which is one of a plurality of lower nodes among the plurality of nodes of the tree structure and a predetermined threshold, whether or not to form a first group by using first data of the first node and second data of the second node;
generating the first group by grouping the first data and the second data which are determined to be grouped as a result of the determination;
generating, when the first node of the search target is a leaf node, one or a plurality of second groups by grouping the leaf node of the search target;
after generating the first and the second groups, traverse the tree structure in a reverse manner by back tracking from one of the lower nodes to one of the upper nodes and, when third data returned while traversing the tree structure in the reverse manner from said one of the lower nodes to said one of the upper nodes is not determined to belong to any one of first and second groups of the lower nodes; merge the third data into any one of the first and second group of the lower nodes; and
merging at least two of the first and second groups of the lower nodes.

7. A computer readable non-transitory recording medium embodying a program, the program causing a computer to perform a method, the method comprising:
searching data in a tree structure which has a plurality of nodes including data as an element by traversing the tree structure stored in a storage;
determining, based on a similarity associated with an edge between a first node, which is one of a plurality of upper nodes among the plurality of nodes, of a search target and a second node, which is one of a plurality of lower nodes among the plurality of nodes of the tree structure and a predetermined threshold, whether or not to form a first group by using first data of first node and second data of the second node;

generating the first group by grouping the first data and the second data which are determined to be grouped as a result of the determination;

generating, when the first node of the search target is a leaf node, one or a plurality of second groups by grouping the leaf node of the search target;

after generating the first and the second groups, traverse the tree structure in a reverse manner by back tracking from one of the lower nodes to one of the upper nodes and, when third data returned while traversing the tree structure in the reverse manner from said one of the lower nodes to said one of the upper nodes is not determined to belong to any one of first and second groups of the lower nodes, merge the third data into any one of the first and second groups of the lower nodes; and merging at least two of the first and second groups of the lower nodes.

\* \* \* \* \*

UNITED STATES PATENT AND TRADEMARK OFFICE
CERTIFICATE OF CORRECTION

PATENT NO. : 10,482,075 B2
APPLICATION NO. : 15/517735
DATED : November 19, 2019
INVENTOR(S) : Shoji Nishimura It is certified that error appears in the above-identified patent and that said Letters Patent is hereby corrected as shown below:

In the Claims

Column 16, Line 29; In Claim 6, after "between", insert --a--

Column 16, Line 49; In Claim 6, delete "nodes;" and insert --nodes,-- therefor

Column 16, Line 50; In Claim 6, delete "group" and insert --groups-- therefor

Column 16, Line 66; In Claim 7, after "of", insert --the--

Signed and Sealed this
Twenty-fourth Day of November, 2020

Andrei Iancu
*Director of the United States Patent and Trademark Office*